(12) United States Patent
Nagai et al.

(10) Patent No.: US 8,276,100 B2
(45) Date of Patent: Sep. 25, 2012

(54) INPUT CONTROL DEVICE

(75) Inventors: Tetsuya Nagai, Kanagawa (JP); Koichi Sakai, Kanagawa (JP); Hideo Kawai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 12/374,171

(22) PCT Filed: Jul. 20, 2006

(86) PCT No.: PCT/JP2006/314387
§ 371 (c)(1),
(2), (4) Date: Jan. 16, 2009

(87) PCT Pub. No.: WO2008/010278
PCT Pub. Date: Jan. 24, 2008

(65) Prior Publication Data
US 2009/0293021 A1   Nov. 26, 2009

(51) Int. Cl.
*G06F 3/048* (2006.01)
(52) U.S. Cl. .......................... 715/862; 715/856
(58) Field of Classification Search .................. 715/862, 715/856
See application file for complete search history.

(56) References Cited

U.S. PATENT DOCUMENTS

| | | | | |
|---|---|---|---|---|
| 5,287,448 A * | 2/1994 | Nicol et al. | ...... | 715/707 |
| 5,754,176 A * | 5/1998 | Crawford | ...... | 715/711 |
| 5,764,219 A * | 6/1998 | Rutledge et al. | ...... | 345/159 |
| 6,078,308 A * | 6/2000 | Rosenberg et al. | ...... | 715/856 |
| 6,362,842 B1 * | 3/2002 | Tahara et al. | ...... | 715/856 |
| 6,466,197 B1 * | 10/2002 | Kim et al. | ...... | 345/156 |
| 6,618,063 B1 * | 9/2003 | Kurtenbach | ...... | 715/834 |
| 7,240,299 B2 * | 7/2007 | Abrams | ...... | 715/857 |
| 7,600,201 B2 * | 10/2009 | Endler et al. | ...... | 715/863 |
| 2004/0160427 A1 * | 8/2004 | Keely et al. | ...... | 345/179 |

FOREIGN PATENT DOCUMENTS

| | | | |
|---|---|---|---|
| JP | 08-123647 A | | 5/1996 |
| JP | 08123647 | * | 5/1996 |
| JP | 2000-242385 A | | 9/2000 |
| JP | 2000242385 | * | 9/2000 |
| JP | 2005-149279 A | | 6/2005 |
| JP | 2006-164058 A | | 6/2006 |
| JP | 2006164058 | * | 6/2006 |

OTHER PUBLICATIONS

International Search Report of PCT Application No. PCT/JP2006/314387 dated Oct. 17, 2006.

* cited by examiner

*Primary Examiner* — Phenuel Salomon
(74) *Attorney, Agent, or Firm* — Panasonic Patent Center; Dhiren Odedra; Kerry Culpepper

(57) ABSTRACT

An input control device for enabling the user to perform predetermined operation for an icon simply by performing move operation of a pointer without button operation is provided. An operation selection area generation section 167 generates position information of an area indicating operation corresponding to selection and activation of predetermined operation for an object to be selected, and a display section 15 displays an operation selection area based on the operation selection area position information. When an operation selection determination section 168 determines that a pointer arrives at the operation selection area, it instructs a control section 19 to execute operation for the icon corresponding to the operation selection area information. Upon reception of the instruction, the control section 19 activates and executes the operation corresponding to the operation selection area.

17 Claims, 11 Drawing Sheets

FIG.8

| MEMO |
|---|
| MEMO 1 ·················· |
| MEMO 2 ·················· |
| MEMO 3 ·················· |
| MEMO 4 ·················· |

INPUT CONTROL DEVICE

TECHNICAL FIELD

This invention relates to an input control unit used with an information apparatus such as a computer or a mobile terminal.

BACKGROUND ART

In recent years, in an information apparatus such as a computer or a mobile terminal, an input device such as a pointing device has been generally used as means for entering information by easy operation independently of key operation. To use a mobile terminal installing a pointing device of mouse type, write pen type, etc, used conventionally, the user needs to hold the mobile terminal with one hand and operate the pointing device with the other hand; they are hard to use because both hands of the user are full.

Then, to enable the user to operate a pointer on a display screen with one hand, a recent mobile terminal has been provided with a pointing device such as a cross key, a jog dial, or a touch pad for scrolling the display or moving the display position of a cursor or a pointer. The user moves the cross key, the touch pad, etc., as required, moves the display pointer to any desired location or position, for example, an icon displaying an operational object, and presses the button operatively associated with the pointing device, whereby processing of entering, searching for, editing, transmitting and receiving, etc., information can be performed.

However, in the related art, if more than one step of execution command operation for the operational object is required, it is difficult for the user to perform the more than one step of execution command operation and there is a problem of complication of operation.

A related art to cope with such a problem is described in patent document 1. In this art, a control system detects that a cursor remains for a predetermined time in an area of an object of one icon, etc., displayed on a screen, and displays operation objects representing the operation descriptions (left click, right click, and double click) for the icon in the proximity of the icon. Further, if the user positions a pointing device cursor at any of the operation objects and selects the operation object, the control system executes the selected operation object, for example, "double click" for the icon.
Patent document 1: JP-A-2000-242385

DISCLOSURE OF THE INVENTION

Problems to be Solved by the Invention

The control system in patent document 1 displays the operation objects when the pointer arrives at the icon. However, the expiration of a predetermined time after display of the operation objects is required and direct operation at the same time as the pointer arrives at the icon cannot be realized.

It is an object of the invention to provide an input control unit for more facilitating operation and information input of an information apparatus.

Means for Solving the Problems

The invention provides an input control device applied to an apparatus for specifying a predetermined position in a display section according to a pointer, and the input control device comprising:

a pointer position determination section which generates pointer position information indicating a display position of the pointer in the display section based on operation information from an operation input section of the apparatus;

a match detection section which generates match detection information indicating that the pointer exists on an object to be selected based on the pointer position information and object-to-be-selected position information indicating the display position of the object to be selected by the pointer;

an operation selection area generation section which generates an operation selection area corresponding to selection of predetermined operation for the object to be selected in the display section based on the match detection information; and an operation selection determination section which selects and activates an operation for the object to be selected corresponding to the operation selection area when the operation selection determination section determines that the pointer passes through the operation selection area based on the pointer position information and operation selection area position information indicating the generation position of the operation selection area.

The configuration described above enables the user to perform predetermined operation for the objected to be selected simply by operating the pointer, and the usability of the apparatus can be improved.

The input control device further includes a direction determination section for determining a move direction of the pointer until the pointer arrives at the object to be selected based on the pointer position information, in which case the operation selection area generation section generates the operation selection area based on move direction information indicating the move direction.

The configuration described above makes it possible to generate the operation selection area considering the pointer move direction.

In the case described above, the operation selection area generation section generates the operation selection area so as to avoid an advance prediction direction predicted from the move direction information. Further, the operation selection area generation section also generates the operation selection area in a direction substantially at 90 degrees of the advance prediction direction.

According to the configuration described above, if the pointer passes through the operation selection area carelessly, activating of unnecessary operation can be easily prevented.

The operation selection area generation section may generate the operation selection area in a predetermined direction in the display section. According to the configuration, processing can be simplified.

The operation selection area generation section may generate the operation selection area contiguous to the object to be selected. According to the configuration, operation of the pointer can be simplified and smoothed.

The operation selection area generation section preferably generates at least two operation selection areas, but may generate only one. If two operation selection areas are included, the two areas may differ in operation or may not differ in operation; it is desirable that the two areas should be generated on opposite sides with the object to be selected as the center.

The operation selection area generation section can generate the operation selection area in the display section in a visible manner. The operation selection area generation section may generate at least two operation selection areas and the two operation selection areas may equal in size and may be generated on opposite sides with the object to be selected as the center. The two operation selection areas may differ in size.

The operation selection area generation section can generate the operation selection area with the center of the object to be selected or the pointer as the reference.

The input control device described above can be used with various types of apparatus; preferably it is used with a mobile apparatus. The object to be selected is an icon, and the operation selection areas contain at least areas for performing open operation and drag operation for the icon. The configuration enables the user to easily perform open operation, drag operation, and drop operation of the icon.

The invention also provides a control method of an input control device applied to an apparatus for specifying a predetermined position in a display section according to a pointer, and the control method includes the steps of generating pointer position information of a display position of the pointer in the display section based on operation information from an operation input section of the apparatus; generating match detection information indicating that the pointer exists on an object to be selected based on the pointer position information and object-to-be-selected position information indicating the display position of the object to be selected according to the pointer; generating an operation selection area corresponding to selection of predetermined operation for the object to be selected in the display section based on the match detection information; and selecting and activating operation for the object to be selected corresponding to the operation selection area when the operation selection determination section determines that the pointer has passed through the operation selection area based on the pointer position information and operation selection area position information indicating the generation position of the operation selection area.

The invention also provides a program for operating an input control device applied to an apparatus for specifying a predetermined position in a display section according to a pointer, and the program causes the input control device to execute the steps of generating pointer position information of a display position of the pointer in the display section based on operation information from an operation input section of the apparatus; generating match detection information indicating that the pointer exists on an object to be selected based on the pointer position information and object-to-be-selected position information indicating the display position of the object to be selected according to the pointer; generating an operation selection area corresponding to selection of predetermined operation for the object to be selected in the display section based on the match detection information; and selecting and activating operation for the object to be selected corresponding to the operation selection area when the operation selection determination section determines that the pointer has passed through the operation selection area based on the pointer position information and operation selection area position information indicating the generation position of the operation selection area.

ADVANTAGES OF THE INVENTION

The invention can provide the input control device which has the advantage that it enables the user to perform predetermined operation for the object to be selected simply by performing move operation of the pointer without additional operation.

BRIEF DESCRIPTION OF THE DRAWINGS

FIG. 8 is a drawing to show an execution example of operation corresponding to the operation selection area.

DESCRIPTION OF REFERENCE NUMERALS

Figure 1:
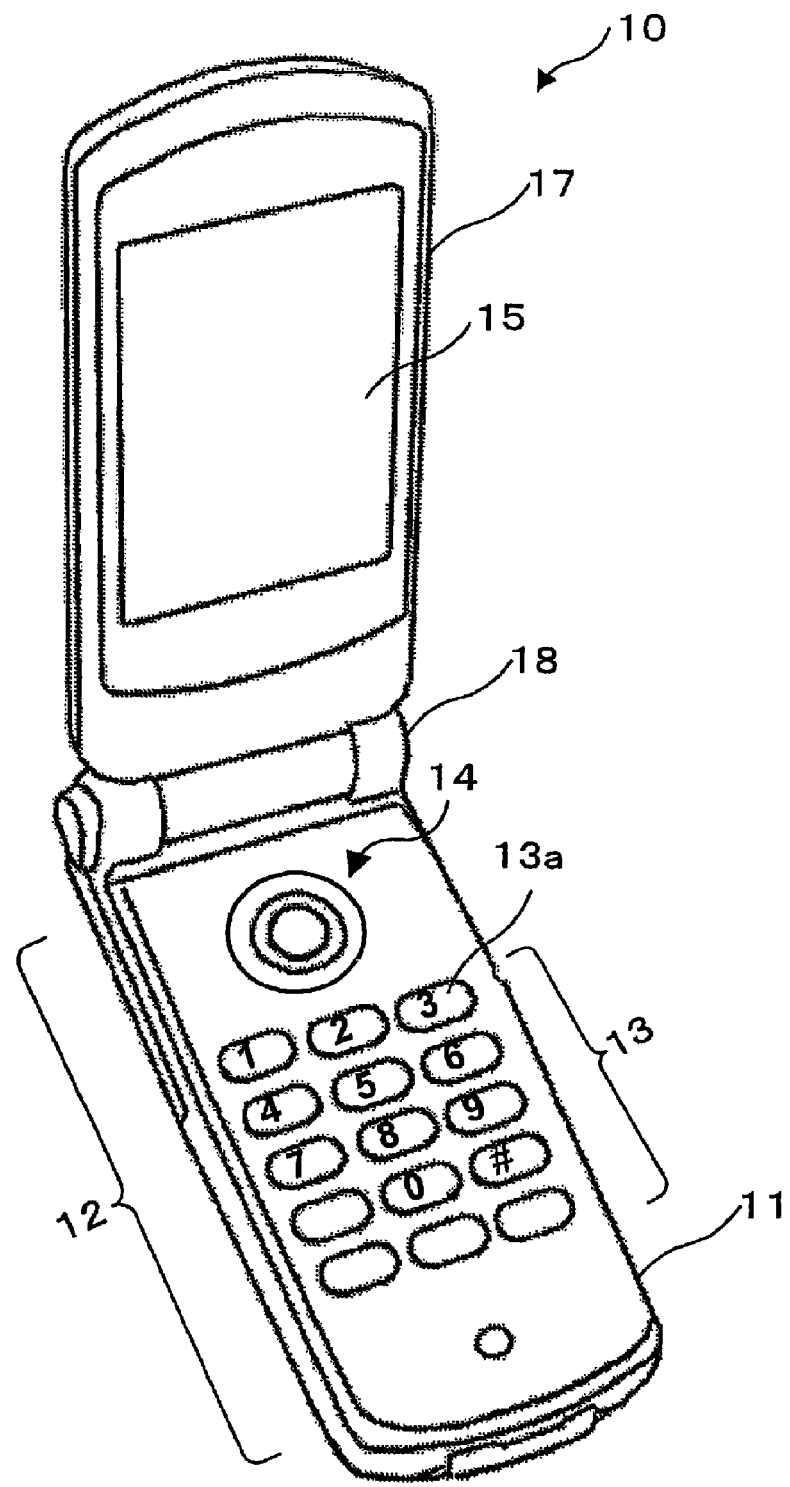
FIG. 1 is an external view of a mobile telephone in which an input control device in an embodiment of the invention is installed.

10 Mobile telephone
11 Lower cabinet
12 Operation section
13 Input key section
14 Upper operation input section
15 Display section
16 Input control section
17 Upper cabinet
18 Hinge part
19 Control section
141 Cross key
142 Touch pad
161 Pointer position determination section
162 Pointer display specification section
163 Icon position storage section
164 Icon display specification section
165 Match detection section
166 Direction determination section
167 Operation selection area generation section
168 Operation selection determination section

BEST MODE FOR CARRYING OUT THE INVENTION

An input control device of an embodiment of the invention will be discussed below with the accompanying drawings:

FIG. 1 is an external view of a mobile telephone in which an input control device in the embodiment of the invention is installed.

A mobile telephone 10 is made up of an upper cabinet 17 and a lower cabinet 11 which are connected so that they can be opened and closed through a hinge part 18. The lower cabinet 11 includes an operation section 12 containing an input key section (lower operation input section) 13 and an upper operation input section 14, and the upper cabinet 17 has a display section 15 implemented as a liquid crystal display, etc.

The input key section 13 is formed on the side below the upper operation input section 14 (distant side from the hinge part) and is made up of a plurality of keys (numeric keys) 13a as a suboperation input section such as a power key, numeric keys (0 to 9 and the keys are assigned alphabetical letters a to z), a # key, an * key, and a menu key, and enables the user to perform operation of turning on/off power, displaying and selecting an operation menu on the display section 15, entering a digit and a character, receiving and originating a telephone call and mail transmission and reception through an antenna (not shown), etc., as the user presses any ten key 13a.

Figure 2:
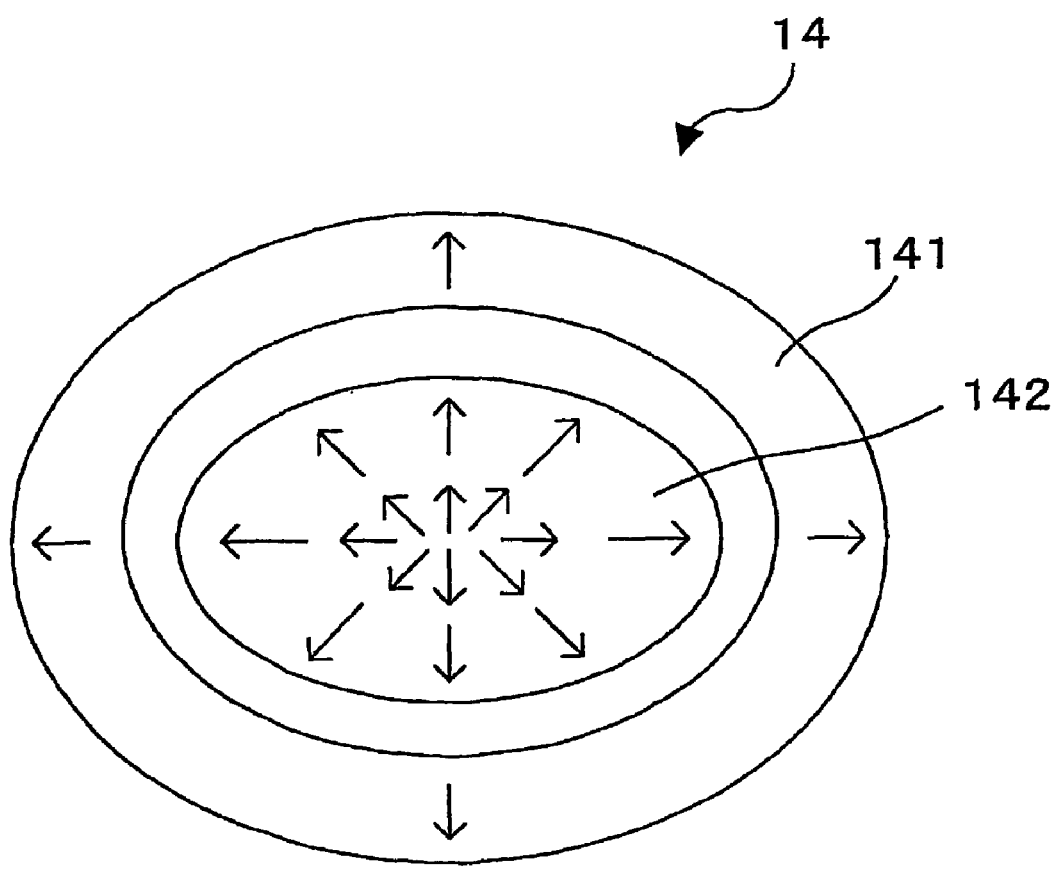
FIG. 2 is an enlarged view of an operation section.

As shown in FIG. 2, the upper operation input section 14 is formed on the side above the input key section 13 (near side to the hinge part) and is made up of an annular cross key 141 and a touch pad 142 placed in the center of the cross key 141. The cross key 141 is used to move a cursor up and down and from side to side and scroll display, and if the user touches the touch pad 142 with a thumb, etc., the screen pointer moves 360 degrees as desired (see the arrows in the figure).

In the embodiment, if the user moves the pointer on the display section 15 and moves the pointer to the object to be selected (icon) on the display section 15 by operating the touch pad 142 of the upper operation input section 14, automatically an operation realizing area of open (corresponding to double click of a mouse), drag, etc., is formed and operation corresponding to the area is realized simply by moving the pointer to the area.

Figure 3:
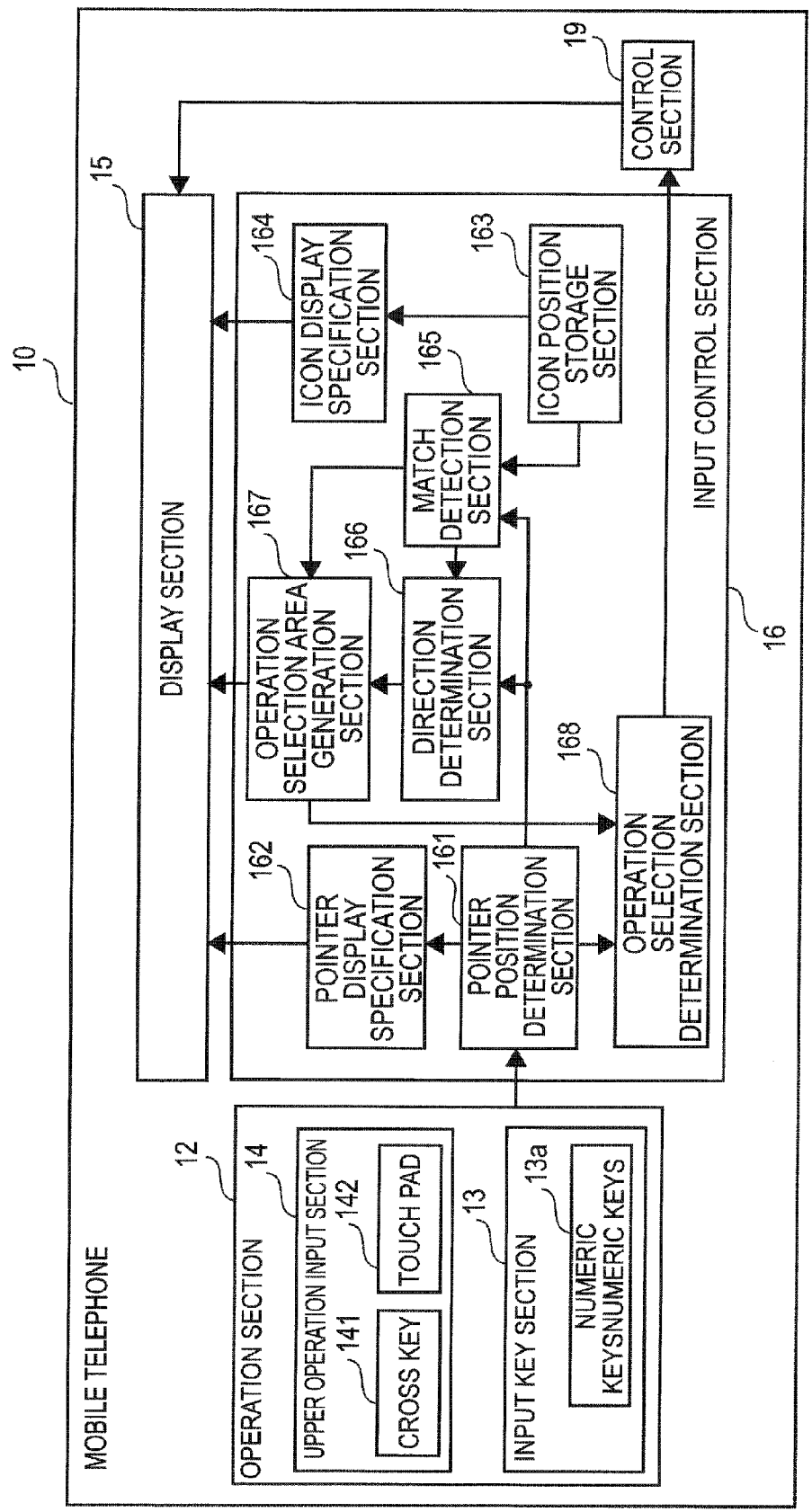
FIG. 3 is a block diagram to show the configuration of the mobile telephone in which the input control device in the embodiment of the invention is installed.

FIG. 3 is a block diagram to show the configuration of the mobile telephone in which the input control device in the embodiment of the invention is installed.

In FIG. 3, the mobile telephone 10 has the operation section 12 made up of the input key section 13 and the upper operation input section 14 described above, the display section 15, an input control section 16, and a control section 19.

The input control section 16 has a pointer position determination section 161, a pointer display specification section 162, an icon position storage section 163, an icon display specification section 164, a match detection section 165, a direction determination section 166, an operation selection area generation section 167, and an operation selection determination section 168.

The pointer position determination section 161 stores the current position of the pointer as coordinates and determines the display position of the pointer in the display section 15 based on operation information corresponding to pointer operation input of the user to the upper operation input section 14 and generates pointer position information (coordinate point on the screen).

The pointer display specification section 162 outputs the pointer position information and display information as a graphic form having an area containing the shape, color, etc., of the pointer (information to display the pointer on the screen) to the display section 15, thereby specifying where the pointer is to be displayed on the screen for the display section 15.

The icon position storage section 163 is memory previously storing icon position information of a position (area-like range) in the display section 15 to display the icon to be selected according to the pointer.

The icon display specification section 164 outputs the icon position information stored in the icon position storage section 163 and display information as a graphic form having an area containing the shape, color, etc., of the icon (information to display the icon on the screen) to the display section 15, thereby specifying where the icon is to be displayed on the screen for the display section 15.

The match detection section 165 generates match detection information indicating that the pointer exists on a predetermined icon based on the pointer position information indicating the display position of the pointer and the icon position information indicating the display position of the icon, and sends the match detection information to the direction determination section 166.

The direction determination section 166 references the pointer position information generated by the pointer position determination section 161 and monitors the motion of the pointer and upon reception of a notification that the pointer exists on one icon (upon reception of a notification that the pointer arrives at one icon) from the match detection section 165, the direction determination section 166 determines which direction the pointer arrives at the icon from based on the motion of the pointer just before reception of the notification, namely, change in the pointer position. Then, the direction determination section 166 determines which direction the position of an icon operation selection area and the range thereof are in based on pointer move direction information indicating the direction from which the pointer arrives, and sends the result to the operation selection area generation section 167 and the operation selection determination section 168.

The operation selection area generation section 167 generates an operation selection area corresponding to selection and activation of predetermined operation for the object to be selected based on the match detection information and the pointer move direction information and sends to the display section 15. Here, the operation selection area generation section 167 generates operation selection area position information indicating where display information as a graphic form having an area containing the shape, color, etc., of the operation selection area (information to display the operation selection area on the screen) is to be displayed on the screen, and sends the operation selection area position information to the display section 15 and the operation selection determination section 168.

When the operation selection determination section 168 determines that the pointer has passed through the operation selection area based on the pointer position information and the operation selection area position information from the operation selection area generation section 167, the operation selection determination section 168 instructs the control section 19 to execute operation for the icon corresponding to the operation selection area.

The control section 19, which controls the whole operation of the mobile telephone 10 the mobile telephone 10, executes icon operation such as open or drag based on operation selection information from the operation selection determination section 168 and causes the display section 15 to display the result.

The operation of the mobile telephone 10 described above will be discussed using a flowchart shown in FIG. 4, a display example of an icon group shown in FIG. 5, an operation selection area example displayed when a pointer is moved onto an icon shown in FIG. 6, an example of generating operation selection areas at 90 degrees in the advance prediction direction of the pointer shown in FIG. 7, and an example of executing operation corresponding to the operation selection area shown in FIG. 8.

To begin with, the match detection section 165 determines whether or not the pointer exists on an icon (step S401). The match detection section 165 generates match detection information indicating that the pointer exists on an icon based on the pointer position information indicating the display position of the pointer from the pointer position determination section 161 and the icon position information indicating the display position of the icon from the icon position storage section 163, and sends the match detection information to the direction determination section 166.

If the match detection section 165 determines that the pointer does not exist on an icon at step S401, it repeatedly executes step S401 and waits for the pointer to move onto an icon.

On the other hand, if the match detection section 165 determines that the pointer exists on an icon at step S401, the direction determination section 166 determines which direction the pointer arrives at the icon from (pointer move direction) (step S402). The direction determination section 166 monitors the motion of the pointer based on the pointer position information of the pointer position determination section 161 and upon reception of a notification that the pointer exists on an icon from the match detection section 165, the direction determination section 166 determines which direction the pointer arrives at the icon from based on the motion of the pointer just before reception of the notification. Then, the direction determination section 166 determines which direction the position of an icon operation selection area and the range thereof are in based on the pointer move direction information corresponding to the pointer move direction, and sends the result to the operation selection area generation section 167 and the operation selection determination section 168.

Next, the operation selection area generation section 167 generates an operation selection area (step S403). The operation selection area generation section 167 generates an operation selection area corresponding to selection and activation of predetermined operation for the object to be selected (icon) based on the match detection information from the match detection section 165 and the pointer move direction information from the direction determination section 166. At the same time, the operation selection area generation section 167 also generates display information of the shape, color, etc., of the operation selection area and operation selection area position information indicating where the operation selection area is to be displayed on the screen, and sends the information to the display section 15.

The display section 15 displays the operation selection area based on the operation selection area position information generated at step S403 (step S404).

Figure 5:
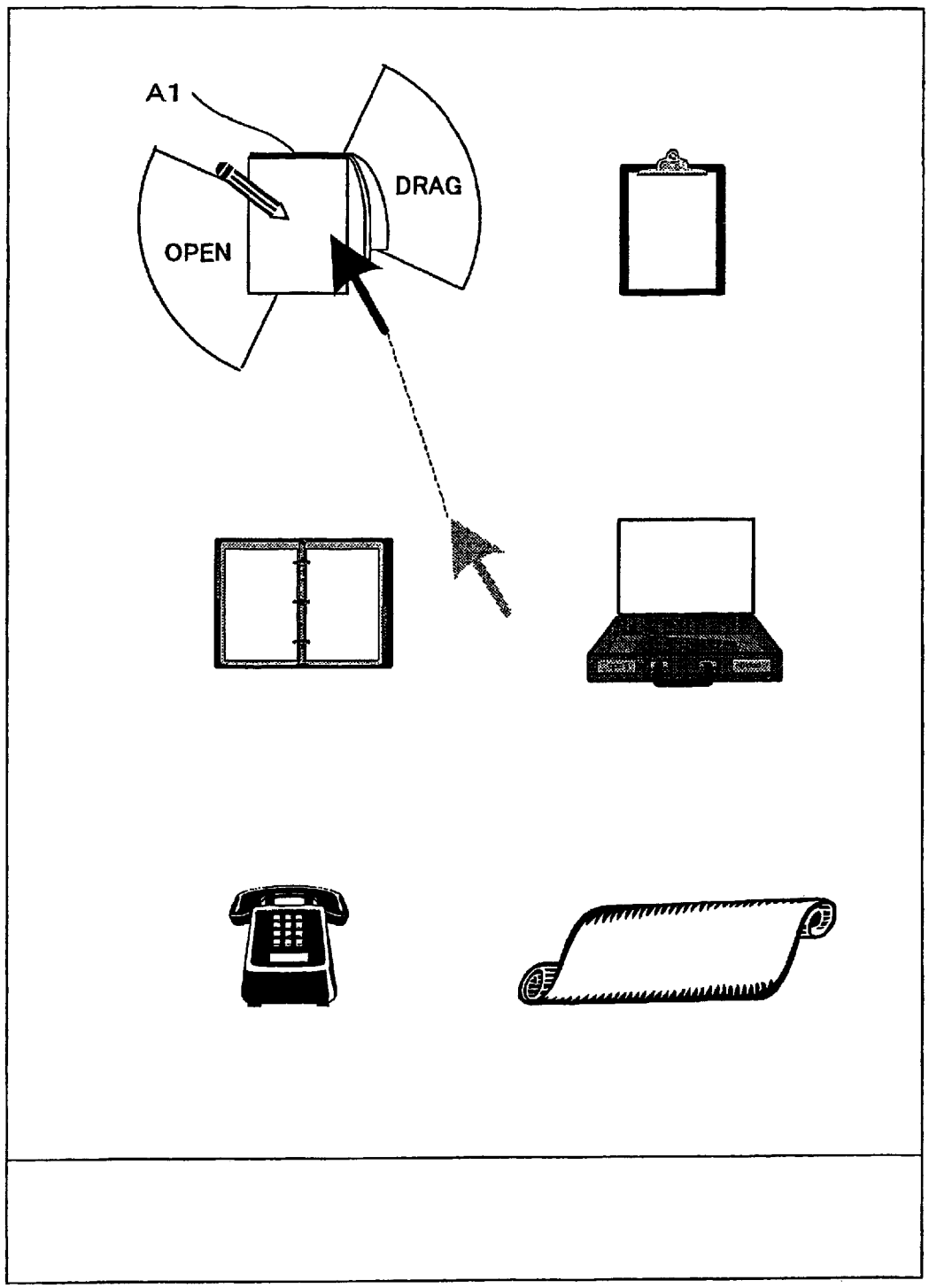
FIG. 5 is a drawing to show an icon group.
Figure 6:
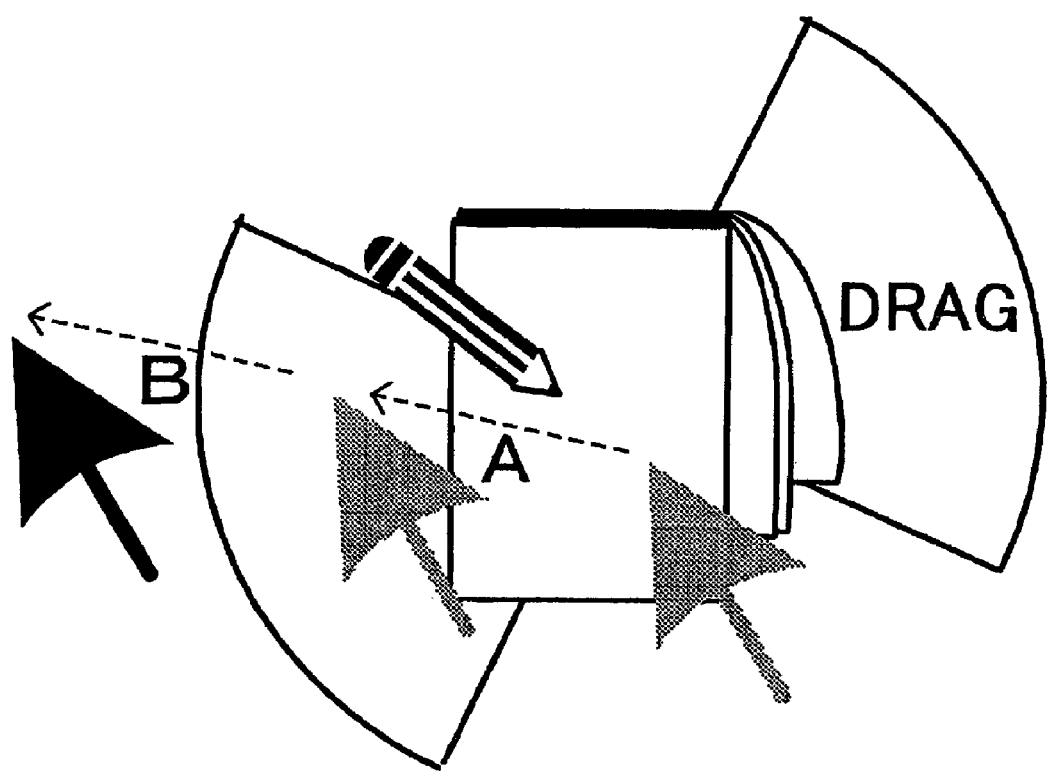
FIG. 6 is a drawing to show an example of operation selection areas displayed when a pointer is moved to an icon.

FIG. 5 shows a display example of an icon group and FIG. 6 is a drawing to show a situation in which a pointer passes through an operation selection area displayed when the pointer arrives at an icon.

In FIGS. 5 and 6, for example, if the pointer is moved to an icon A1 of "MEMO" in FIG. 5, the match detection section 165 detects the pointer existing on the icon "MEMO" and the operation selection area generation section 167 generates operation selection areas as shown in FIGS. 5 and 6. In the example shown in FIGS. 5 and 6, two operation selection areas "OPEN (open)" and "DRAG (drag)" different in operation are generated like fans on opposite sides with the icon "MEMO" as the center. Moreover, when generating the operation selection areas, the operation selection area generation section 167 generates the operation selection areas so as to avoid the pointer move direction predicted from the pointer move direction information until the pointer arrives at the icon (the advance prediction direction of the pointer).

As in the example, the operation selection areas are generated in the left and right directions roughly at 90 degrees from the advance prediction direction of the pointer. FIG. 7 shows a concept of generating two operation selection areas roughly at 90 degrees in the advance prediction direction of the pointer. In the example, the "DRAG (drag)" area of the two operation selection areas is generated in the 90-degree range with the generation direction of the operation selection area, 0 degrees (the right in the generation direction of the operation selection area in FIG. 7) as the center. On the other hand, the "OPEN (open)" area is generated in the 90-degree range with the generation direction of the operation selection area, 180 degrees (the left in the generation direction of the operation selection area in FIG. 7) as the center. That is, the size of the "OPEN (open)" area is equal to that of the "DRAG (drag)" area. If the pointer passes through the top of the icon, operation for the icon may be unnecessary (simple passage of the pointer). However, if an operation selection area is generated in the advance prediction direction in such a case, needless operation for the icon is activated and inconvenience occurs.

Figure 7:
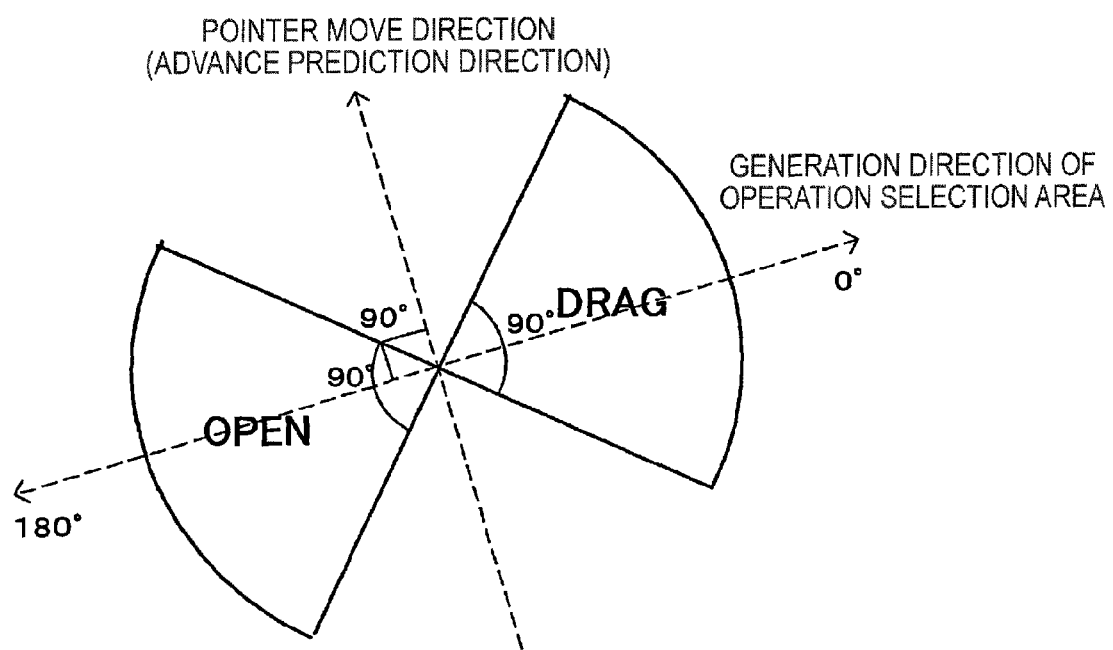
FIG. 7 is a drawing to show an example of generating operation selection areas at 90 degrees in the advance prediction direction of the pointer.

However, the operation selection area generation section 167 generates the operation selection areas so as to avoid the advance prediction direction of the pointer as in FIGS. 5 to 7, whereby eliminating the inconvenience described above is facilitated. In this case, the direction in which the operation selection area is generated is not limited to roughly 90 degrees, of course.

Next, the operation selection determination section 168 determines whether or not the pointer has left the icon as shown in a first move A in FIG. 6 based on the pointer position information and the operation selection area position information indicating the generation position of the operation selection area (step S405). If the operation selection determination section 168 determines that the pointer has left the icon, the process goes to step S406; if the operation selection determination section 168 determines that the pointer does not leave the icon, it repeats determining at step S405. Whether or not the whole of the pointer has left the icon may be used as the determination criterion or whether or not a part (tip, etc.,) of the pointer has left the icon may be used as the determination criterion.

If it is determined at step S405 that the pointer has left the icon, the operation selection determination section 168 determines whether or not the pointer has passed through the operation selection area as shown in a second move B in FIG. 6 based on the pointer position information and the operation selection area position information (step S406). If the operation selection determination section 168 determines that the pointer has passed through the operation selection area, it instructs the control section 19 to execute operation for the icon corresponding to the operation selection area information and upon reception of the instruction, the control section 19 activates and executes the operation corresponding to the operation selection area (step S407).

Figure 8:
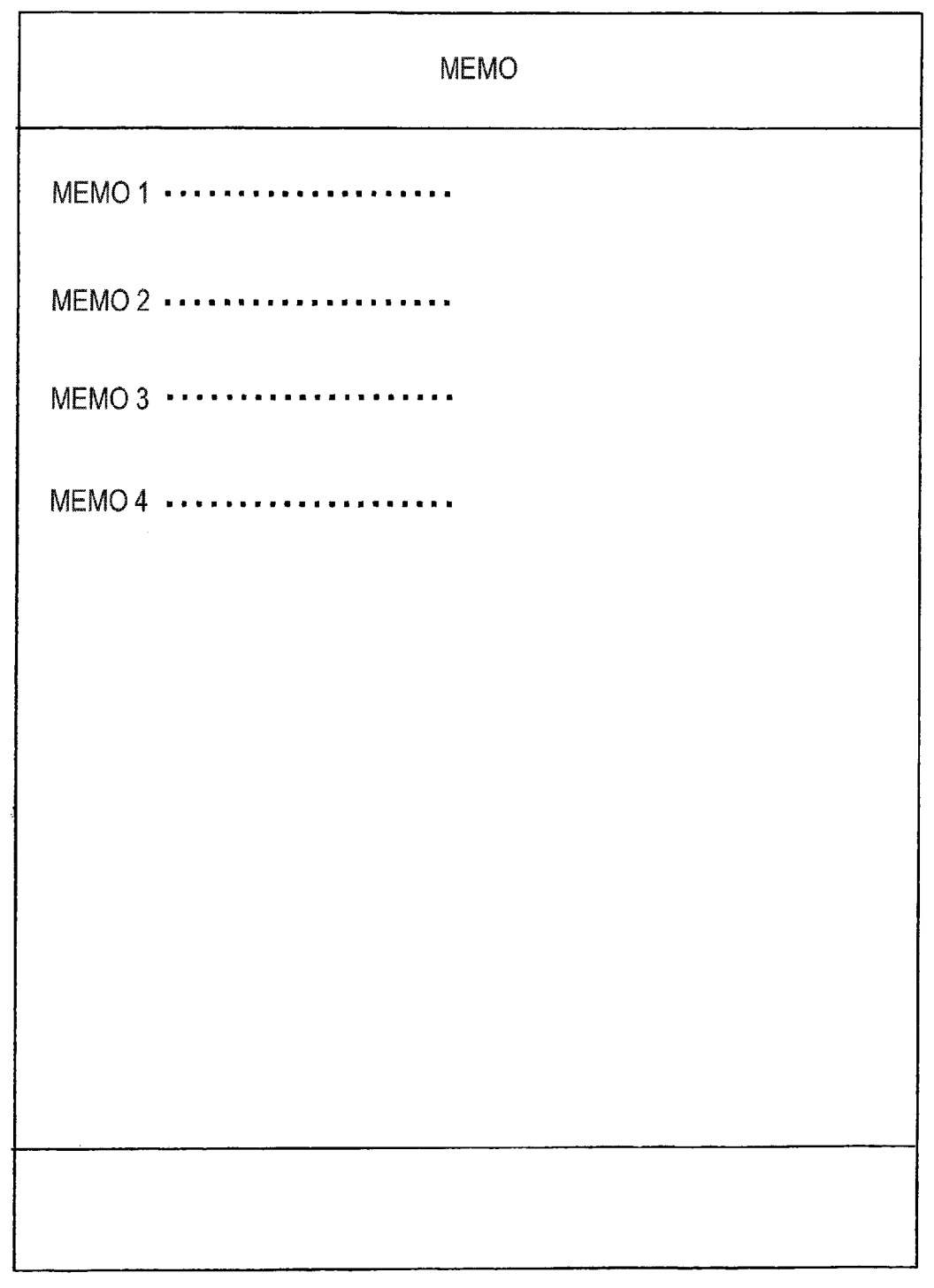

FIG. 8 shows an execution example of the operation corresponding to the operation selection area. In FIG. 8, if the user moves the pointer to the operation selection area "OPEN (open)" displayed contiguous to the icon of "MEMO" shown in FIG. 6 and further passes the pointer through the operation selection area, the icon "MEMO" is opened.

After the operation is activated and executed at step S407, the process returns to step S401 and the match detection section 165 again determines whether or not the pointer exists on an icon.

If the operation selection determination section 168 determines at step S406 that the pointer does not pass through the operation selection area, it is assumed that the pointer has entered a general area (any other area than the icon display area), namely, the pointer simply has left the icon, the process returns to step S401, the match detection section 165 determines whether or not the pointer exists on an icon, and similar operation is repeated. The case where the pointer returns to the icon after step S405 is also possible as the case where it is determined that the pointer does not pass through the operation selection area. In such a case, control may be performed so as to return to step S405.

According to the input control device of the embodiment of the invention, if it is detected that the pointer exists on an icon, two operation selection areas different in operation are generated on opposite sides with the icon as the center and if it is determined that the pointer has passed through the generated operation selection area, the operation corresponding to the operation selection area is activated and executed. Accordingly, the user can perform predetermined operation for the icon simply by performing move operation of the pointer without button operation; a mouse, etc., also becomes unnecessary and simplification of the configuration and shortening of the operation can be realized.

Operation selection can be smoothed by generating the operation selection area contiguous to the icon as the object to be selected. However, placing the object to be selected and the operation selection area contiguous to each other is not indispensable and both can also be formed as they are separated.

In the description given above, two operation selection areas different in operation are generated on opposite sides with the icon as the center by way of example, but the invention is not limited to the mode and, for example, the following is also possible:

The two operation selection areas need not be of the same size; one operation selection area may be made large and the other may be made comparatively small.

Figure 9:
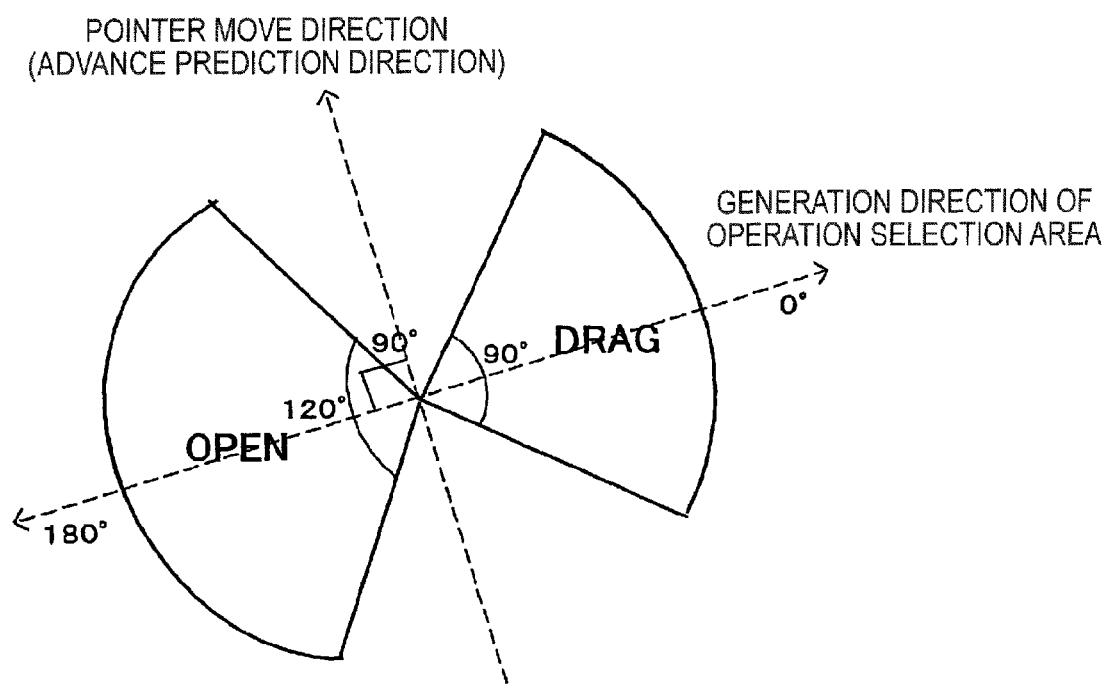
FIG. 9 is a drawing to show an example wherein an "OPEN" portion is large (45 degrees to 360 degrees).

FIG. 9 shows an example wherein the "open" portion is large (45 degrees to 360 degrees). In this example, a "DRAG (drag)" area of the two operation selection areas is generated in the 90-degree range with the generation direction of the operation selection area, 0 degrees (see FIG. 9) as the center as in the example in FIG. 7. On the other hand, an "OPEN (open)" area is generated in the 120-degree range with the generation direction of the operation selection area, 180 degrees (see FIG. 9) as the center unlike the example in FIG. 7. That is, the size of the "OPEN (open)" area is larger than that of the "DRAG (drag)" area. In the example, the two areas differ in the generation angle range as the generation range, but may differ in the generation radius as the generation range.

Figure 10A:
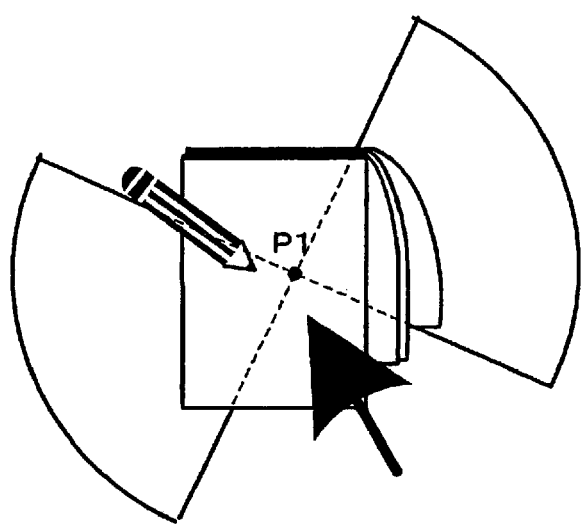
FIG. 10(a) is a drawing to show an example of displaying operation selection areas with the center of an icon as the origin and FIG. 10(b) is a drawing to show an example of displaying operation selection areas with the tip of the pointer as the origin.

When the operation selection area generation section 167 generates the operation selection area, how the operation selection area is to be generated is not limited. For example, the operation selection area can be generated with the center, the center of gravity of the object to be selected as the reference. FIG. 10(a) shows an example of displaying operation selection areas with a center P1 of an icon of the object to be selected as the origin (reference).

Figure 10B:
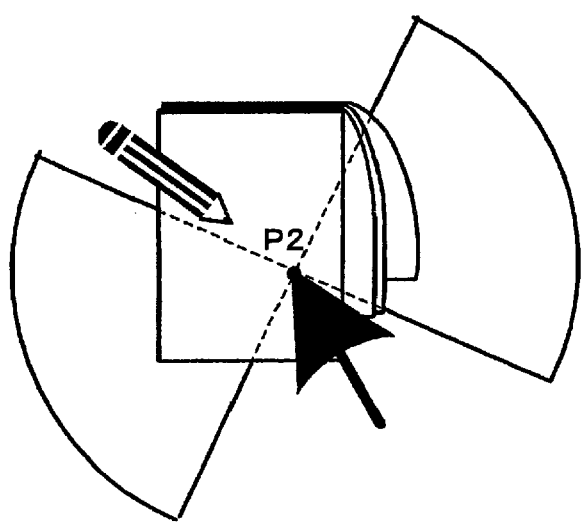

On the other hand, the operation selection areas can also be generated with the pointer as the reference. For example, the operation selection areas may be displayed with the tip of the pointer as the origin. FIG. 10(b) shows an example of displaying operation selection areas with a tip P2 of the pointer as the origin (reference).

In the examples described above, the operation selection areas are visible. However, if the user becomes accustomed to operation, display of the operation selection areas on the display section 15 may be skipped although the operation selection areas are provided. Accordingly, the screen processing load can be lightened.

Figure 11:
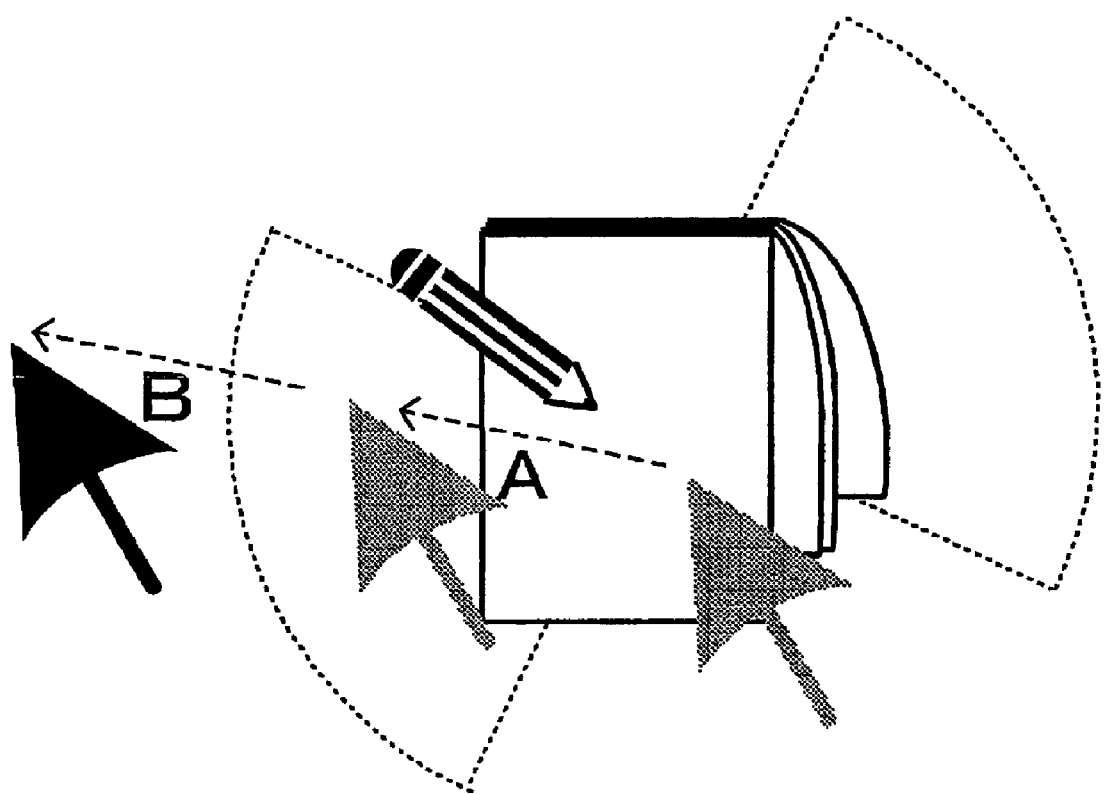
FIG. 11 is a drawing to show an example wherein provided operation selection areas are not displayed.

FIG. 11 shows an example wherein provided operation selection areas are not displayed. In such a case, the operation selection areas are not displayed and are not visible. However, if the user accustomed to such a mode moves the pointer to the operation selection area, the operation corresponding to the operation selection area is activated and executed.

The direction in which the operation selection area is generated is not limited, and the operation selection area need not necessarily be generated so as to avoid the move direction of the pointer. For example, the operation selection area generation section 167 can generate the operation selection area in a predetermined direction (for example, in a roughly horizontal direction, etc.,) in the display section 15 regardless of the motion of the pointer. Such a configuration lightens the screen processing load.

In the description given above, open and drag operation are taken as an example, but the invention is not limited to the mode and it is also possible to execute a different application in response to the pointer move direction. That is, the "operation for the object to be selected" is not limited and can contain all processing that can be selected and activated according to the pointer.

Figure 4:
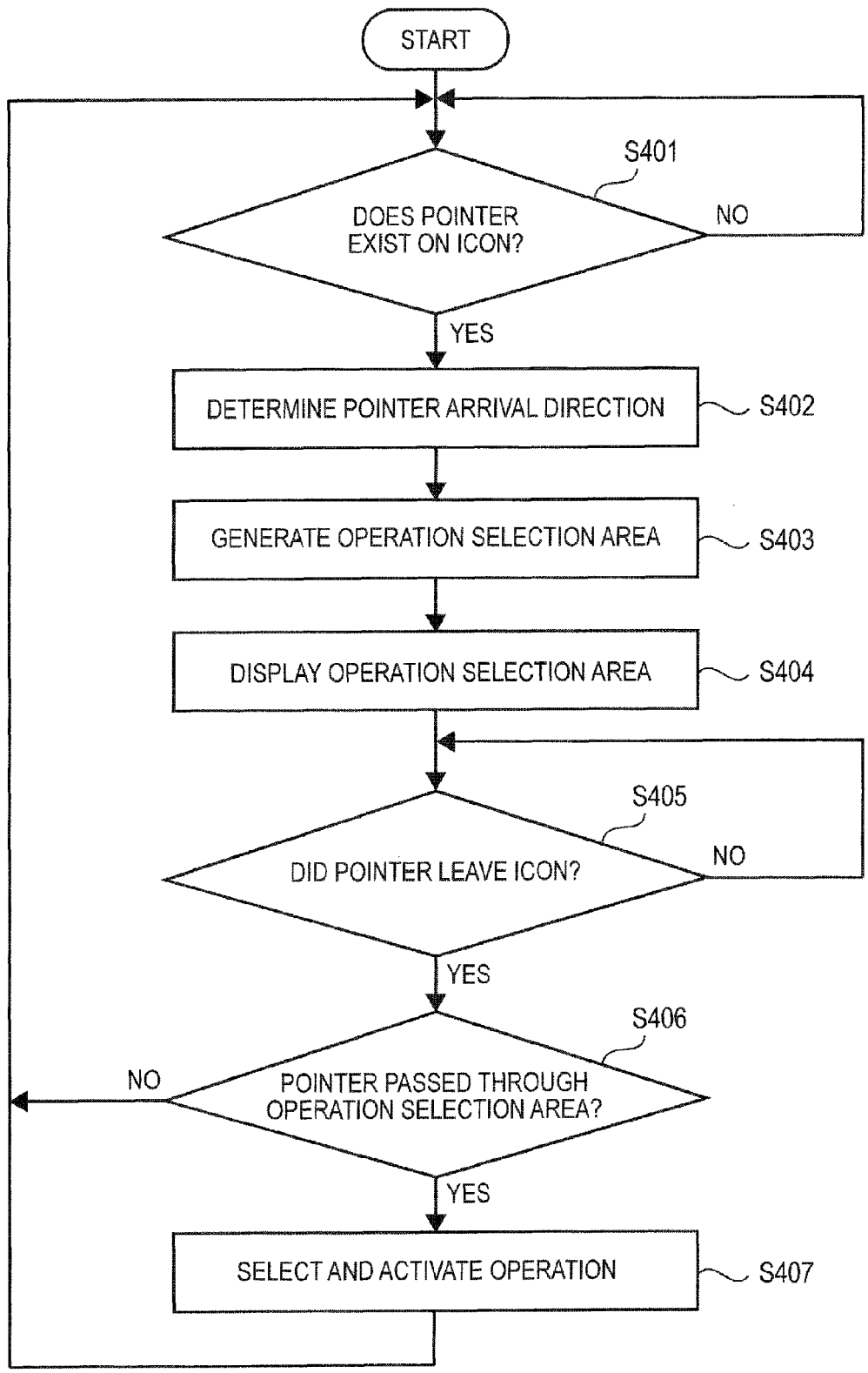
FIG. 4 is a flowchart to describe the operation of the input control device in the embodiment of the invention.

The invention also provides a program for causing the input control device to execute the procedure as shown in FIG. 4. The program is retained in a memory area provided in the control section 19 or storage in the input control section 16, the mobile telephone 10, and causes the input control section 16 to execute a predetermined procedure.

In the embodiment, the operation input section for determining the pointer position is implemented as the touch pad 142 shown in FIG. 2, but the application of the input control device of the invention is not limited to such an operation mode.

The mobile terminal incorporating the input control device is not limited to a mobile telephone and any other mobile apparatus such as a PDA (Personal Digital Assistant) is also contained. Further, the apparatus incorporating the input control device is not only a mobile apparatus, but also a stationary apparatus.

While the embodiments of the invention have been described, it is to be understood that the invention is not limited to the items disclosed in the embodiments and the invention also intends that those skilled in the art make changes, modifications, and application based on the Description and widely known arts, and the changes, the modifications, and the application are also contained in the scope to be protected.

INDUSTRIAL APPLICABILITY

As described above, the input control device according to the invention has the advantage that it enables the user to perform predetermined operation for the icon simply by performing move operation of the pointer without button operation, and is useful as an input control device, etc., for more facilitating operation and information input of a mobile terminal.

The invention claimed is:

1. An input control device applied to an apparatus for specifying a predetermined position in a display section according to a pointer, the input control device comprising:
a control section;
a pointer position determination section which generates pointer position information indicating a display position of the pointer in the display section based on operation information from an operation input section of the apparatus;
a match detection section which generates match detection information indicating that the pointer exists on an object to be selected based on the pointer position information and object-to-be-selected position information indicating the display position of the object to be selected by the pointer;

an operation selection area generation section which generates an operation selection area corresponding to selection of predetermined operation for the object to be selected in the display section based on the match detection information;

an operation selection determination section which selects and activates an operation for the object to be selected corresponding to the operation selection area when the operation selection determination section determines that the pointer passes through the operation selection area based on the pointer position information and operation selection area position information indicating the generation position of the operation selection area; and a direction determination section which determines a move direction of the pointer until the pointer arrives at the object to be selected based on the pointer position information, wherein the operation selection area generation section generates the operation selection area based on move direction information indicating the move direction, and avoiding an advance prediction direction predicted from the move direction information.

2. The input control device according to claim 1, wherein the operation selection area generation section generates the operation selection area in a direction substantially at 90 degrees of the advance prediction direction.

3. The input control device according to claim 1, wherein the operation selection area generation section generates the operation selection area in a predetermined direction in the display section.

4. The input control device according to claim 1, wherein the operation selection area generation section generates the operation selection area contiguous to the object to be selected.

5. The input control device according to claim 1, wherein the operation selection area generation section generates at least two operation selection areas.

6. The input control device according to claim 5, wherein the at least two operation selection areas are different in operation to each other; and wherein the at least two operation selection areas are generated on opposite sides with respect to the object to be selected as the center.

7. The input control device according to claim 1, wherein the operation selection area generation section generates the operation selection area in the display section in a visible manner.

8. The input control device according to claim 7, wherein the operation selection area generation section generates at least two operation selection areas which are equal in size to each other; and wherein the two operation selection areas are generated on opposite sides with respect to the object to be selected as the center.

9. The input control device according to claim 7, wherein the operation selection area generation section generates at least two operation selection areas which are different in size to each other.

10. The input control device according to claim 1, wherein the operation selection area generation section generates the operation selection area which is located with respect to the center of the object to be selected as the reference.

11. The input control device according to claim 1, wherein the operation selection area generation section generates the operation selection area with respect to the pointer as the reference.

12. The input control device according to claim 1, wherein the match detection section generates the match detection information indicating that the pointer exists on an object to be selected based on the pointer position information and object-to-be-selected position information indicating the display position of the object to be selected by the pointer as soon as the pointer exists on the object.

13. An apparatus comprising:
the input control device according to claim 1.

14. The apparatus according to claim 13, wherein the object to be selected is an icon; and wherein the operation selection area contains at least areas for performing an open operation and a drag operation for the icon.

15. A mobile terminal implemented as the apparatus according to claim 13.

16. A control method of an input control device applied to an apparatus for specifying a predetermined position in a display section according to a pointer, the input control device including a control section, the control method comprising:

generating pointer position information indicating a display position of the pointer in the display section based on operation information from an operation input section of the apparatus;

generating match detection information indicating that the pointer exists on an object to be selected based on the pointer position information and object-to-be-selected position information indicating the display position of the object to be selected by the pointer;

generating an operation selection area corresponding to selection of predetermined operation for the object to be selected in the display section based on the match detection information; and selecting and activating an operation for the object to be selected corresponding to the operation selection area when the operation selection determination section determines that the pointer passes through the operation selection area based on the pointer position information and operation selection area position information indicating the generation position of the operation selection area, wherein the operation selection area is further generated based on move direction information indicating the move direction, and avoiding an advance prediction direction predicted from the move direction information.

17. A non-transitory computer readable medium having stored therein a program, the program for operating an input control device applied to an apparatus for specifying a predetermined position in a display section according to a pointer, the program for causing the input control device to execute:

generating pointer position information indicating a display position of the pointer in the display section based on operation information from an operation input section of the apparatus;

generating match detection information indicating that the pointer exists on an object to be selected based on the pointer position information and object-to-be-selected position information indicating the display position of the object to be selected by the pointer;

generating an operation selection area corresponding to selection of predetermined operation for the object to be selected in the display section based on the match detection information; and selecting and activating an operation for the object to be selected corresponding to the operation selection area when the operation selection determination section determines that the pointer passes through the operation selection area based on the pointer position information and operation selection area position information indicating the generation position of the operation selection area, wherein the operation selection area is further generated based on move direction information indicating the move direction, and avoiding an advance prediction direction predicted from the move direction information.

* * * * *